United States Patent
Farley

[19]

[11] Patent Number: 6,101,588
[45] Date of Patent: Aug. 8, 2000

[54] DEVICE LEVEL BUSY ARRANGEMENT FOR MASS STORAGE SUBSYSTEM INCLUDING A PLURALITY OF DEVICES

[75] Inventor: Martin Farley, Wellesley, Mass.

[73] Assignee: EMC Corporation, Hopkinton, Mass.

[21] Appl. No.: 08/937,897

[22] Filed: Sep. 25, 1997

[51] Int. Cl.[7] ...................................................... G06F 17/30
[52] U.S. Cl. ........................... 711/168; 711/150; 711/151; 711/152; 711/158; 711/163
[58] Field of Search ............................ 711/111, 113, 134, 711/129, 166, 168, 150, 151, 152, 158, 163; 395/527, 726; 710/242

[56] References Cited

U.S. PATENT DOCUMENTS

| | | | |
|---|---|---|---|
| 5,493,724 | 2/1996 | Cohn et al. ................................ | 711/111 |
| 5,706,467 | 1/1998 | Vishlitzky et al. ....................... | 711/129 |
| 5,751,993 | 5/1998 | Ofek et al. ................................ | 711/113 |
| 5,787,473 | 7/1998 | Vishlitzky et al. ....................... | 711/134 |
| 5,829,048 | 10/1998 | Ofer et al. ................................ | 711/166 |
| 5,845,147 | 12/1998 | Vishlitzky et al. ......................... | 710/5 |
| 5,867,686 | 2/1999 | Conner et al. ............................ | 395/726 |
| 5,896,513 | 4/1999 | Fisch et al. ............................... | 395/527 |

*Primary Examiner*—John W. Cabeca
*Assistant Examiner*—Fred F. Tzeng
*Attorney, Agent, or Firm*—Richard A. Jordan; John M. Gunther

[57] ABSTRACT

A mass storage subsystem is used with a digital data processing system, the digital data processing system also including at least one host computer for generating access requests. The mass storage subsystem includes a data storage subsystem, a cache memory and a host adapter. The data storage subsystem includes at least one data storage device, the data storage device including a plurality of logical data store, each for storing a plurality of data items. Each data storage device is associated with a respective device lock used regulate access thereto. The cache memory includes a plurality of cache slots each caching data items from respective logical data stores. Each cache slot is associated with a slot lock for use in regulating access thereto. The host adapter receives access requests from the host computer, and is responsive to each access request to initially determine whether it holds the device lock associated with the data storage device containing the data item to be accessed in response to the respective access request. The host adapter, in response to a negative determination, determines whether the logical data store containing the data item to be accessed is said at least one cache slot and, if so, uses the slot lock associated therewith to control access thereby to the data item to be accessed.

14 Claims, 7 Drawing Sheets

DEVICE LEVEL BUSY ARRANGEMENT FOR MASS STORAGE SUBSYSTEM INCLUDING A PLURALITY OF DEVICES

FIELD OF THE INVENTION

The invention relates generally to the field of digital computer systems and more particularly to systems and method for use particularly in, for example, transaction processing environments, in which information from records stored on mass storage subsystems used in such systems is accessed and updated generally irregularly, to enhance the real- or near-real-time processing of transactions in connection with such information.

BACKGROUND OF THE INVENTION

In modern "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

One particular type of processing often performed in enterprise computing environments is termed "transaction" processing. In transaction processing, information relating to transactions for particular records is processed so as to update the records, preferably on a "real-time" or nearly real-time basis. Real- or near real-time updating of the records ensures that the records will continually contain information that is up-to-date so that, if the record is accessed shortly after the transaction, the record will reflect the proper information including the update for the transaction. For example, in a banking context, if a bank customer wishes to initiate a transaction to withdraw cash from his or her bank account at, for example an automatic teller machine, the record for the bank account will need to be accessed to verify that the customer has sufficient funds in the account to cover the withdrawal and, if so, updated to reflect the withdrawal. Preferably, the access to the account record to verify that the customer has sufficient funds in the account will be performed on a real- or near-real-time basis so that the customer is not unduly delayed in receiving the cash. In addition, preferably the access to the account record to update the account to reflect the withdrawal will also be performed on a real- or near-real-time basis so that, if the customer wishes to initiate a subsequent transaction with respect to the account immediately or shortly after the first transaction, such as checking the account balance or initiating another withdrawal, the account information in the record will correctly reflect the account balance after the first transaction.

Several problem arise in connection with systems for performing transaction processing. Typically in such systems, a number of "hosts" through which the transactions are entered are accessing the mass storage subsystems, on which the record information is stored, at a relatively rapid rate. In addition, generally the mass storage subsystems maintain locking mechanisms which limit access to the storage devices which are used in such systems. As a result, while one host has a storage device locked, other hosts cannot obtain access to the storage device to retrieve information from or store information on the storage device, which can delay processing of transactions therewith.

SUMMARY OF THE INVENTION

The invention provides a new and improved digital computer system and mass storage subsystem for use in such system, for enhancing the real- or near-real-time processing of transactions in connection with record stored on such mass storage subsystem.

In brief summary, a mass storage subsystem is used with a digital data processing system, the digital data processing system also including at least one host computer for generating access requests. The mass storage subsystem includes a data storage subsystem, a cache memory and a host adapter. The data storage subsystem includes at least one data storage device, the data storage device including a plurality of logical data store, each for storing a plurality of data items. Each data storage device is associated with a respective device lock used regulate access thereto. The cache memory includes a plurality of cache slots each caching data items from respective logical data stores. Each cache slot is associated with a slot lock for use in regulating access thereto. The host adapter receives access requests from the host computer, and is responsive to each access request to initially determine whether it holds the device lock associated with the data storage device containing the data item to be accessed in response to the respective access request. The host adapter, in response to a negative determination, determines whether the logical data store containing the data item to be accessed is said at least one cache slot and, if so, uses the slot lock associated therewith to control access thereby to the data item to be accessed.

By allowing the host adapter to essentially by-pass the device lock if the data items from the logical data store, which includes the data item requested in the access request, are cached in a cache slot in the cache memory, and using the slot lock to regulate access thereto, multiple host adapters can to contemporaneously access diverse ones of the cache slots which are caching information from respective data storage devices. Thus, multiple host adapters can retrieve information from or store information in the cache slots which are related to diverse logical data stores of the same storage device, without needing to obtain the device lock for the data storage device.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
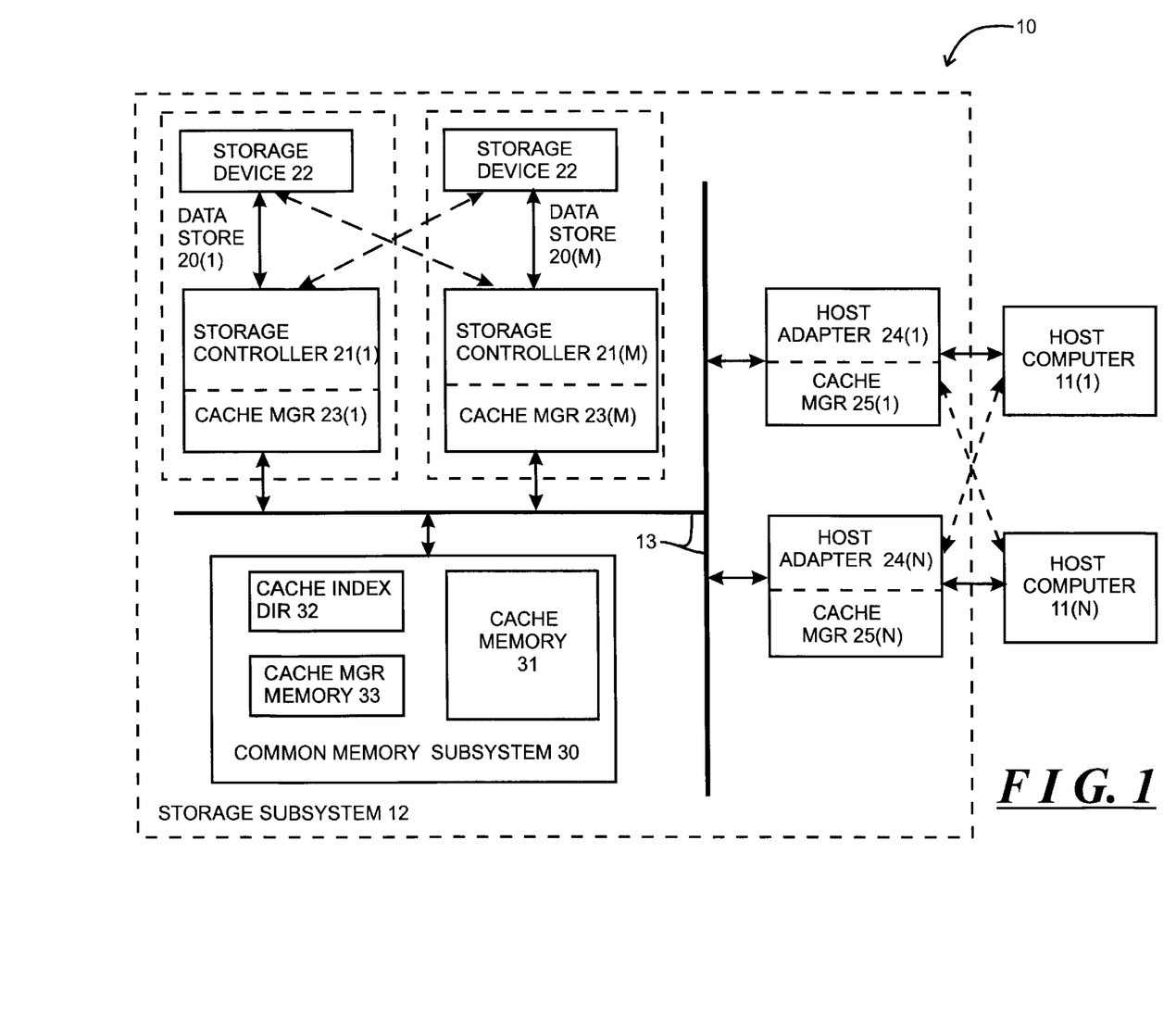
FIG. 1 is a functional block diagram of a digital computer system, including a mass storage subsystem constructed in accordance with the invention.

The invention provides a digital computer system 10 that provides for enhanced operation in connection with, for example, a transaction processing application and environment in which information is retrieved and often quickly updated generally irregularly from records distributed over storage media stored in a mass storage subsystem. The invention will be described in connection with a digital computer system 10 depicted in functional block diagram form in FIG. 1. With reference to FIG. 1, computer system 10 includes a plurality of host computers 11(1) through 11(N) (generally identified by reference numeral 11(n)) connected to a digital data storage subsystem 12. The digital data storage system 12 stores data and other information that is utilized by the host computers 11(n) in their processing, and stores processed or otherwise updated information transferred to it by the host computers 11(n) for storage. Each host computer 11(n) may comprise, for example, a personal computer, workstation, or the like which may be used by a single operator, or a multi-user computer system which may be used by a number of operators.

The digital data storage subsystem 12 in one embodiment is generally similar to the digital data storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). The digital data storage system 12 comprises one or more data stores 20(1) through 20(M) (generally identified by reference numeral 20(m)), one or more host adapters 24(1) through 24(N) (generally identified by reference numeral 24(n)), and a common memory subsystem 30, all of which are interconnected by one or more common buses generally identified by reference numeral 13. The host adapters 11(n) operate to interface the host computers 11(n) to the digital data storage subsystem 12, and in that connection receive storage and retrieval requests from the respective host adapters 11(n), transfer (in the case of a storage operations) the information to be stored to other components of the subsystem 12 for storage, and retrieve (in the case of a retrieval operation) the information to be retrieved from other components of the subsystem 12 for provision to the respective host computer 11(n). Generally, retrieval operations and storage operations in connection with the digital data storage subsystem 12 will collectively be referred to as "access operations."

The data stores 20(m) store information in the form of records, which, in one embodiment, are in the well-known "CKD" (count-key-data) format. The common memory subsystem 30 operates as a cache to cache information from the data stores 20(m), and, as will be described below in greater detail, in performing the retrieval and storage operations, the host adapters 24(n) operate to retrieve information from, and store information in, the common memory subsystem 30. If the particular record in the data store 20(m) which is to be retrieved during a retrieval operation, or which is to be updated during a storage operation, is not cached in the common memory subsystem 30, the respective host adapter 24(n) and the appropriate data store cooperate as necessary to enable the record to be cached, after which the host adapter 24(n) can retrieve information from (in the case of a retrieval operation) or store updated information in (in the case of a storage operation) the common memory subsystem 30. In these operations, the host adapters 24(n), data stores 20(m) and common memory subsystem 30 communicate over the common bus 30, and in one embodiment access to the bus 13 is controlled by bus access control circuitry distributed among these components. In controlling access to the bus 13, the bus access control circuitry may use any of a number of known bus access arbitration techniques.

Each data store 20(m) includes a storage controller 21(m) and one or more storage devices generally identified by reference numeral 22. The storage devices 22 may comprise any of the conventional magnetic disk and tape storage devices, as well as optical disk storage devices and CD-ROM devices from which information may be retrieved. Each storage controller 21(m) connects to bus 13 and controls the storage of information which it receives thereover in the storage devices 22 connected thereto. In addition, each storage controller 21(m) controls the retrieval of information from the storage devices 22 which are connected thereto for transmission to the common memory subsystem 30 for storage. In one embodiment, in which the storage devices 22 comprise magnetic disk storage devices, each storage device 22 stores information on disks organized in a plurality of cylinders, with each cylinder comprising one or more tracks, each of which can generally store one or more records.

As noted above, the common memory subsystem 30 operates to cache information from the data stores 20(m) for access by the hosts computers 11(n) through the host adapters 24(n). The common memory subsystem 30 includes a cache memory 31, a cache index directory 32 and a cache manager 33, which are generally similar to those described in U.S. patent application Ser. No. 07/893,509 filed Jun. 4, 1995, in the name of Moshe Yanai, et al., entitled "System And Method For Dynamically Controlling Cache Management," and U.S. Pat. No. 5,592,432, entitled "Cache Management System Using Time Stamping For Replacement Queue," issued Jan. 7, 1997, in the name of Natan Vishlitzky, et al., (hereinafter referred to as the "Ofek application"), all of which are assigned to the assignee of the present invention and incorporated herein by reference. The cache memory 31 operates as a cache buffer in connection with storage and retrieval operations, in particular caching update information provided by the host adapters 24(n) during a storage operation and information received from the data stores 20(m) which may be retrieved by the host adapters 24(n) during a retrieval operation.

Figure 2:
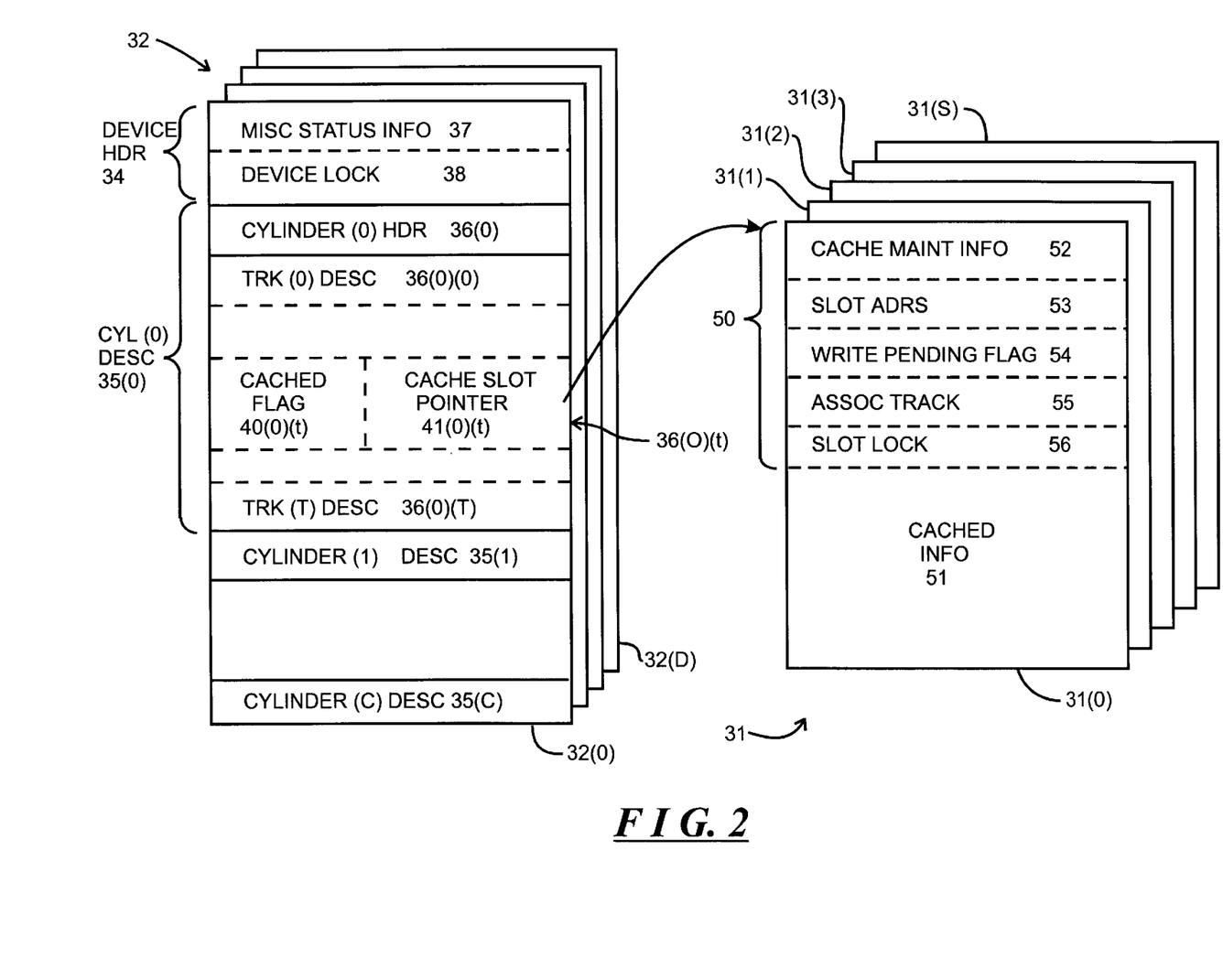
FIG. 2 depicts the organization of a cache memory and cache index directory useful in understanding the operation of the storage subsystem depicted in FIG. 1.

The cache memory 31 and cache index directory 32 will generally be described in connection with FIG. 2. With reference to FIG. 2, the cache memory 31 includes a plurality of storage locations, which are organized in a series of cache slots 31(0) through 31(S) (generally identified by reference numeral 31(s)). The storage locations are, in turn, identified by a series of addresses, with the starting address of each cache slot being identified by a base address. The cache slots 31(s) provide the cache buffering for the information common memory subsystem 30 as described above.

The cache index directory 32 operates as an index for the cache slots 31(s) in the cache memory 31. The cache index directory 32 includes a plurality of cache index tables 32(0) through 32(D) (generally identified by reference numeral 32(d)), each of which is associated with one of the storage devices 22 in the storage subsystem 12. Each cache index table 32(d) includes a device header field 34, which provides, for example, in a field 37 selected identification and status information for the device 22 associated with the cache index table 32(d). In addition, the device header field 34 includes a device lock field 38 that stores a device lock used to regulate access to the particular storage device 22 associated with the cache index table 32(d) as will be described below. In addition, each cache index table 32(d)

includes a plurality of cylinder descriptors 35(1) through 35(C) (generally identified by reference numeral 35(c)) each of which is associated with one of the cylinders in the storage device 22 that is associated with the cache index table 32(d). Each cylinder descriptor 35(c), in turn, includes a cylinder header 36(c), which provides, for example, selected identification and status information for the cylinder associated with the cylinder descriptor 35(c).

In addition, each cylinder descriptor 35(c) includes a plurality of track descriptors 35(c)(0) through 35(c)(T) (generally identified by reference numeral 35(c)(t)), each of which is associated with one of the tracks in the cylinder 35(c). Each track descriptor 35(c)(t), in turn, includes information for the associated track of the storage device 22, including whether the track is associated with a cache slot 31(s) in the cache memory 31, and, if so, the identification of the cache slot 31(s) with which the track is associated. In one embodiment, each track descriptor 35(c)(t) includes a cached flag 40(c)(t), a cache slot pointer 41(c)(t), and may also include other status and control information (not separately shown). The cached flag 40(c)(t), if set, indicates that the track associated with the track descriptor 35(c)(t) is, in turn, associated with a cache slot. If the cached flag 40(c)(t) is set, the cache slot pointer 41(c)(t) points to one of the cache slots 31(s), thereby associating the track with the respective cache slot 31(s). If the cached flag 40(c)(t) is set, information from the track can be cached in the cache slot 31 (s) identified by the cache slot pointer 41(c)(t) for retrieval by a host adapter 24(n) and updated information can be stored by a host adapter 24(n) in the cache slot 31(n) for later storage on the associated track storage.

Each cache slot 31(s) includes a cache slot header 50 and a cached information storage portion 51. Generally, the cached information portion 51 contains the information that is cached in the cache slot 31(s) for the track that is associated with the cache slot 31(s). The header portion 50 generally contains information concerning the cache slot 31(s), including information used to maintain the ordering of the cache slots in connection with the particular cache slot replacement algorithm selected for the cache memory 31, the identification of the track associated with the cache slot and information as to whether the cache slot contains updated information from a host adapter 24(n) which needs to be stored on the track associated with the cache slot 31(s).

More specifically, the cache slot's header portion 50 includes a cache maintenance information field 52, a slot address field 53, a write pending field 54, an associated track identifier field 55, and a slot lock field 56, and may also include other status and control information (not separately shown). The cache maintenance information field 52 contains information used in connection with the particular cache slot replacement algorithm which is selected for the cache memory 31. For example, if a least-recently-used cache slot replacement algorithm is used for the cache memory 31, the cache maintenance information field 52 will be used to link the cache slots 31(s) in the cache memory 31 in a doubly-linked list of cache slots, effectively linking the cache slots in an order corresponding to that in which they were most recently accessed by a storage controller 21(m) or host adapter 24(n). The slot address field 53 identifies the address of the cache slot 31(s) in the cache memory 31. The write pending flag 54, if set, indicates that the cache slot contains updated information which needs to be transferred to the respective storage device 22 for storage on the associated track. If the write pending flag 74 is not set, the cache slot 31(s) does not contain updated information. It will be appreciated that, if the write pending flag 74 of the cache slot 31(s) is set, as described above, the cache maintenance information field 52 for the cache slot 31(s) will be updated so as to remove the cache slot 31(s) from the set of cache slots 31(s) which may be available for re-use in connection with the cache replacement algorithm selected for the cache memory 31 until the updated information has been stored on the associated track. After the updated information has been stored on the associated track, the write pending flag 54 can be cleared and the cache maintenance information field 52 can be updated to return the cache slot 31 (s) to the list of cache slots 31(s) which are available for re-use. This will ensure that the cache slot 31(s) will not be re-used, in accordance with the cache slot replacement algorithm used for the cache memory 31 while the cache slot 31(s) contains updated information which has not been stored on the storage device 22. The slot lock field 56 stores a slot lock that regulates access to the cache slot 31(s), as will be described below.

Each of the host adapters 24(n) and each of the device controllers 21(m) includes a cache manager 25(n) and 23(m), respectively, to access to the cache memory 31, cache index directory 32 and cache manager memory 33. The particular operations performed during an access operation will depend on a number of factors, including the access operation to be performed, whether or not the information from the particular track to be accessed is cached in the cache memory 31, and whether or not the information in the respective cache slot 31(s) has been modified or updated by a host adapter's cache manager 25(n) during a storage operation. As described in the aforementioned Shagam application, the host adapters 24(n) typically perform storage and retrieval operations in connection with information that has been cached in the cache memory 31, and the device controllers 21(m) perform "staging" and "de-staging" operations to transfer information in the storage devices 22 to the cache memory 31 for buffering (the staging operations) and to transfer information from the cache memory 31 to the storage devices 22 for storage (the de-staging operations). In performing the staging and de-staging operations, the device controllers 21(m) generally transfer information to and from the cache memory 31 in units of at least a record, that is, they will during a staging operation transfer all of the information in a record from a storage device 22 to a cache slot 31 (s) in the cache memory 31, and during a de-staging operation copy all of the information in respective updated records in the cache memory 31 to the storage device 22 for storage on the associated track.

The cache manager memory 33 maintains a number of work lists which are used to control operations by the host adapters 24(n) and storage controllers 21(m) during an access operation. In particular, the cache manager memory 33 includes a cache slot replacement list, a pending write list and various lists which the host adapters 24(n) and storage controllers 21(m) use to communicate to coordinate staging operations (not shown). It will be appreciated that the various lists maintained by the cache manager memory 33 may comprise any of a number of convenient forms, including queues, trees, stacks or the like. The cache slot replacement list is used to control re-use of cache slots in accordance with the cache-slot replacement algorithm selected for cache memory 31. During a staging operation, the storage controller's cache manager 23(m) uses the cache slot replacement list to select a cache slot 31(s) into which it will load the information retrieved from a storage device. (The aforementioned Shagam and Ofek applications describe modified least-recently-used cache-slot replacement algorithms which can be used in one embodiment of the invention). If the cache slot 31(*s*) does not contain updated information which has not been written to the storage device 22 which contains the track associated with the cache slot 31(*s*), it (that is, the cache slot 31(*s*) will be linked to the cache slot replacement list.

The pending write list is used to identify cache slots 31(*s*) which contain updated information, which has not been written to the storage device which contains the track associated with the cache slot 31(*s*). When a cache slot 31(*s*) contains updated information to be transferred to a storage device 22 as described above, it will be linked into the pending write list, not to the cache slot replacement list. During de-staging operations, the storage controllers' cache managers 23(*m*) will use the write pending list to identify cache slots which contain updated information which is to be written to the appropriate respective storage devices 22.

The staging operation coordination communication lists include a plurality of stage request lists and a plurality of stage completion lists, with one stage request list being associated with each data store 20(*m*) and one stage completion list being associated with each host computer 11(*n*). The host adapters' cache managers 25(*m*) use the stage request lists to store stage requests to be performed by the respective data stores 20(*m*), and the data stores' cache managers 23(*n*) use the stage completion lists to store stage completion messages to indicate to the respective host adapters' cache managers 25(*m*) that the stage requests have been completed.

Generally, a host adapter 24(*n*), during a retrieval operation, attempts to retrieve the information from the cache memory 31. However, if the information is not in the cache memory 31, it will enable the device controller 21(*m*) which controls the storage device 22 that contains the information to be retrieved to "stage" the information from the track which contains the information to be retrieved, that is, to enable the transfer of the information to be retrieved from the track which contains the information that is to be retrieved, into a cache slot 31(*s*) in the cache memory 31. In that process, the host adapter 24(*n*) may select a cache slot 31(*s*) to be used by the storage controller 21(*m*) into which the data is to be staged, the selection being made from the cache slot replacement list as described above. After the information to be retrieved is in the cache slot 31(*s*) in the cache memory 31, the host adapter 24(*n*) will retrieve the information from the cache slot 31(*s*).

Similarly, during a storage operation, the host adapter 24(*n*) will store the information in a cache slot 31(*s*). If the track containing the record to be updated is associated with a cache slot when the host adapter 24(*n*) initiates a storage operation, as will be indicated by the cached flag 40(*c*)(*t*) in the track's descriptor 36(*c*)(*t*) in the cache index directory 32, the host adapter 24(*n*) will store the updated information in the cache slot 31(*s*) associated with the track, as identified by the cache slot pointer 41(*c*)(*t*); this may occur, for example, if information from the track has recently been staged in the cache memory 31 or if the same or another record stored on the track has recently been updated. However, if the track is not associated with a cache slot when the host adapter 24(*n*) initiates a storage operation, the host adapter 24(*n*) will select a cache slot to be associated with the track, and store the updated information in the selected cache slot.

More specifically, as described in the aforementioned Shagam application, during a retrieval operation, the cache manager 25(*n*) of the initiating host adapter 24(*n*) will initially access the cache index table 32(*d*) in the cache index directory 32 associated with the storage device 22 in which the information to be retrieved is stored, in particular accessing the track descriptor 36(*c*)(*t*) of the cylinder descriptor 36(*c*) to determine, from the condition of the cached flag 40(*c*)(*t*), whether the information from the track is cached in a cache slot 31(*s*) in the cache memory. If the cached flag 40(*c*)(*t*) indicates that information from the track is cached in a cache slot 31(*s*), the cache manager 25(*n*) uses the cache slot pointer 41(*t*) to identify the particular cache slot 31(*s*) in which the information is cached and retrieves the required information from the cache slot 31 (*s*).

On the other hand, if the cache manager 25(*n*) determines from the cached flag 36(*c*)(*t*) that the information from the track is not cached in a cache slot 31 (*s*), it will generate a stage request to enable the storage controller 21(*m*) for the storage device 22 which maintains the information to be retrieved, load the stage request in the stage request queue for the data store 21(*m*) and notify the storage controller 21(*m*) that a stage request had been loaded in the stage request queue. At some point after receiving the notification, the storage controller 21(*m*) will retrieve the stage request and perform a staging operation in response thereto. In performing the staging operation, the storage controller 21(*m*) will retrieve the information from the requested track, use the above-described cache slot replacement list to select a cache slot 31 (*s*), load the information into cache slot 31 (*s*) and update the track descriptor 36(*c*)(*t*) in the cache index table 32(*d*) associated with the storage device 22 to indicate that the information from the track is in the cache slot 31 (*s*), in particular setting the cached flag 40(*c*)(*t*) and loading a pointer to the cache slot in the cache slot pointer 41 (*c*)(*t*).

After the storage controller 21(*m*) has completed the staging operation, it will load a staging completed message in the stage completion list in the cache manager memory 33 associated with the host computer 11(*n*) which issued the staging request, and notify the host computer's cache manager 25(*n*) that a stage completed message has been loaded therein. At some point after receiving the notification, the host computer's cache manager 25(*n*) can repeat the operations performed in connection with the retrieval request as described above, in particular accessing the cache index table 32(*d*) in the cache index directory 32 associated with the storage device 22 in which the information to be retrieved is stored, in particular accessing the track descriptor 36(*c*)(*t*) of the cylinder descriptor 36(*c*) to determine, from the condition of the cached flag 40(*c*)(*t*), whether the information from the track is cached in a cache slot 31(*s*) in the cache memory and, if so, use the cache slot pointer 41(*t*) to identify the particular cache slot 31(*s*) in which the information is cached and retrieve the required information from the cache slot 31(*s*). Since at this point the cached flag 40(*c*)(*t*) should indicate that the information from the track is cached in a cache slot 31(*s*), the host adapter's cache manager 25(*n*) should be able to complete the retrieval operation.

During a storage operation, the cache manager 25(*n*) of the initiating host adapter 24(*n*) will initially access the cache index table 32(*d*) in the cache index directory 32 associated with the storage device 22 in which the information to be updated is stored, in particular accessing the track descriptor 36(*c*)(*t*) of the cylinder descriptor 36(*c*) to determine, from the condition of the cached flag 40(*c*)(*t*), whether the information from the track is cached in a cache slot 31(*s*) in the cache memory. If the cached flag 40(*c*)(*t*) indicates that information from the track is cached in a cache slot 31(*s*), the cache manager 25(*n*) uses the cache slot pointer 41(*t*) to identify the particular cache slot 31(*s*) in which the information is cached and loads the update information into the cache slot 31(s). In addition, the host adapter's cache manager 25(n) will remove the identification of the selected cache slot 31(s) from the replacement list to the pending write list so that the cache slot 31(s) will not be re-used until a de-staging operation has been performed in connection with the cache slot 31(s).

On the other hand, if the cache manager 25(n) determines from the cached flag 36(c)(t) that the information from the track is not cached in a cache slot 31(s), it will select a cache slot 31(s) to associated with the track from cache slot replacement list and store the updated information in the cache slot 31(s). In selecting the cache slot 31(s), the cache manager 25(n) will update the track descriptor 36(c)(t) in the cache index table 32(d) associated with the storage device 22 to indicate that the information from the track is in the cache slot 31(s), in particular setting the cached flag 40(c)(t) and loading a pointer to the cache slot 31(s) in the cache slot pointer 41(c)(t). In addition, the cache manager 25(n) will update the cache maintenance information field 52 to link the selected cache slot to the write pending list instead of the cache slot replacement list, and will set the write pending flag 54.

As described above, the data stores' cache managers 23(m) also perform de-staging operations using the pending write list to identify cache slots 31(s) which contain updated information to be written back to the original storage device 22 and track whose information was cached in the respective cache slots 31(s). When a cache slot 31(s) is de-staged, since at that point the information in the cache slot 31(s) corresponds to the information on the respective storage device 22, the data store's cache manager 23(m) which performs the de-staging operation will remove the cache slot's identification from the pending write list and return it to the replacement list so that the cache slot 31(s) can be removed. It will be appreciated, however, that a host computer's cache manager 25(n) may perform a number of retrieval operations and/or storage operations in connection with information in the same cache slot 31(s) after the information in the track cached in the slot has been staged and before it can be de-staged, and so information in a cache slot 31(s) can be updated a number of times before it is de-staged. In addition, it will be appreciated that after a cache slot 31(s) has been de-staged, it may also be updated during a storage operation before the cache slot 31(s) is re-used during a staging operation. When that occurs however, since, as described above, the host computer's cache manager 25(m) removes the cache slot's identification from the replacement list and placed it on the write pending list as part of the storage operation, the cache slot 31(s) will be subject to another de-staging operation before it can be re-used. Thus, a particular cache slot 31(s) may be subject to de-staging a number of times with information cached for the same storage device 22, cylinder and track, without being reused.

In addition, in one embodiment one or more of the cache slots 31(s) may be permanently associated with respective ones of the tracks in the storage devices 22, and in that connection will not be available for re-use in connection with the selected cache slot replacement algorithm. This may be done, for example, at the request of a host computer 11(n) which may be aware that the information contained on the track will be accessed relatively often, or that it will need access to the information with a minimum latency period which may not be available if the information in the track would need to be transferred from the respective storage device 22, or for other reasons which will be apparent to those skilled in the art. To accommodate that, the header 50 of the cache slot 31(s) is also provided with a permanently cached flag (not separately shown) which, if set, indicates that the cache slot 31(s) is not available for re-use. Such a cache slot 31(s) will, if a host adapter 24(n) updates the information contained therein, be linked to the write pending list so that the updated information contained therein can be de-staged; however, after the updated information has been de-staged, the cache slot 31(s) will not be linked to the cache slot replacement list.

As noted above, the device lock field 38 of the device header 34 of each cache index table 32(d) contains a device lock that effectively controls access to the particular storage device 22 that is associated with the cache index table 32(d). Similarly, the slot lock field 56 of the cache slot header 50 of each cache slot 31(s) contains a slot lock that effectively controls access to the particular cache slot 31(s). More specifically, the device lock regulates access to the storage device 22 in connection with storage or retrieval requests from respective ones of the host adapters 24(n). When a host adapter 24(n) issues a storage or retrieval request related to a particular storage device 22, it (that is, the host adapter 24(n)) generally will initially determine whether the device lock in field 38 of the device header 34 of the cache index table 32(d) associated with that storage device is in a "locked" condition. If the device lock is in the locked condition, another host adapter 24(n') (n'≠n) has issued a storage or retrieval request for the storage device associated with the cache index table 32(d), which request has not been completed. On the other hand, if the device lock is not in the locked condition (that is, if it is in an "unlocked" condition), all storage and retrieval requests issued by the other host adapters 24(n') (n'≠n) have been completed. If the host adapter 24(n) determines that the device lock is in the unlocked condition, as part of the storage or retrieval request issuance it will generally condition the device lock to the locked condition, and will return the device lock to the unlocked condition when its storage or retrieval request has been completed; while the device lock is in the locked condition, other host adapters 24(n') will be prevented from issuing storage or retrieval requests for the particular storage device 22.

It will be appreciated that, after the host adapter 24(n) conditioned the device lock of a cache index table 32(d) associated with a particular storage device 22 to the locked condition during issuance of a storage or retrieval request for the storage device, and before it thereafter conditions the device to the unlocked condition, that host adapter 24(n) may itself initiate issuance of subsequent storage and retrieval requests for that particular storage device 22. While the device lock in device lock field 38 is in the locked condition, it will identify the particular host adapter 24(n) which has conditioned it (that is, the device lock) to the locked condition; thus, each host adapter 24(n) can determine from the device lock which host adapter 24(n) can issue storage and retrieval requests for the particular storage device associated with the cache index table 32(d). Thus, the device lock in field 38 of a cache index table 32(d) effectively serves to regulate access to the particular storage device 22 associated with the cache index table 32(d) as among the host adapters 24(n).

The slot lock in slot lock field 56 of header 50 of a cache slot 31(s) serves to regulate access to the particular cache slot 31(s) by the host adapters 24(n) and the storage controllers 21(m). In particular, a storage controller 21(m) or host adapter 24(n) will condition the slot lock in field 56 of a particular cache slot 31(s) when it needs to store data in or retrieve data from the cache slot 31(s). As with the device lock, described above, the slot lock can have a locked condition and an unlocked condition. Thus, if a host adapter 24(n) is to retrieve information from or store information in a cache slot 31(s), which can occur during a respective retrieval or storage operation, it will initially check the condition of the cache slot's slot lock. If the slot lock for the cache slot 31(s) is in the locked condition, the host adapter 24(n) will delay the information retrieval or storage from the cache slot 31(s). On the other hand, if the slot lock for the cache slot 31(s) is in the unlocked condition, the host adapter 24(n) will condition the slot lock to the locked condition and thereafter perform the storage or retrieval operation. Thereafter, the host adapter 24(n) can release the slot lock, by conditioning it to the unlocked condition, or it may perform additional storage and/or retrieval operations in connection with the cache slot 31(s) before conditioning the slot lock to the unlocked condition. While the slot lock associated with cache slot 31(s) is in the locked condition, host adapters 24(n')(n'≠n) will generally be unable to perform storage or retrieval operations in connection with the cache slot 31(s) and storage controllers 21(m) will be unable to perform staging and de-staging operations in connection with the cache slot 31(s).

Similarly, if a storage controller 21(m) is to store information in or retrieve information from a cache slot 31(s), which can occur during a respective staging or de-staging operation, it will initially check the condition of the cache slot's slot lock. If the slot lock for the cache slot 31(s) is in the locked condition, the storage controller 21(m) will delay the information storage or retrieval with the cache slot 31(s). On the other hand, if the slot lock for the cache slot 31(s) is in the unlocked condition, the storage controller 21(m) will condition the slot lock to the locked condition and thereafter perform the storage or retrieval operation. Thereafter, the storage controller 21(m) can release the slot lock, by conditioning it to the unlocked condition, or it may perform additional storage and/or retrieval operations in connection with the cache slot 31(s) before conditioning the slot lock to the unlocked condition. While the slot lock associated with cache slot 31(s) is in the locked condition, host adapters 24(n) will generally be unable to perform storage or retrieval operations in connection with the cache slot 31(s) and storage controllers 21(m')(m'≠m) will be unable to perform staging and de-staging operations in connection with the cache slot 31(s).

After the respective host adapter 24(n) or storage controller 21(m) has released the slot lock, any host adapter 24(n) or storage controller 21(m), including the host adapter or storage controller that just released the slot lock, can thereafter condition the slot lock to the locked condition to perform respective operations in connection with the cache slot 31(s).

In one particular embodiment, the slot lock field 56 of the respective cache slot header 50 actually contains two fields, namely, a current lock holder field and a next lock holder field (not separately shown). The current lock holder field is used to identify the host adapter 24(n) or storage controller 21(m) which is the current lock holder, that is, the device that can store information in or retrieve information from the respective cache slot 31(s). The next lock holder field is used to identify one of the host adapters 24(n) or storage controllers 21(m) that wishes to be the next lock holder, that is, the device that can store information in or retrieve information from the cache slot 31(s) after the current lock holder releases the slot lock. Thus, when a host adapter 24(n) or storage controller 21(m) wishes to perform a storage or retrieval operation in connection with a cache slot 31(s) and determines that the slot lock is in the locked condition, which will occur if the current lock holder field identifies another host adapter 24(n) or storage controller 21(m), if the next lock holder field is empty the host adapter 24(n) or storage controller 21(m) can load its identification in the next lock holder field. When the host adapter 24(n) or storage controller 21(m) which currently holds the slot lock releases the slot lock, it can transfer the identification from the next lock holder field to the current lock holder field thereby to establish the host adapter 24(n) or storage controller 21(m) which is identified there as the new current lock holder. In addition, the releasing host adapter 24(n) or storage controller 21(m) can notify the new current lock holder that it is the new current lock holder. Thereafter, the new current lock holder can perform storage and/or retrieval operations in connection with the cache slot 31(s).

Although the device lock associated with a cache index table 32(d) has been described as controlling access to the storage device 22 associated with the cache index table 32(d) by the respective host adapters 24(n), it will be appreciated that the device lock more particularly controls access to the cache index table 32(d) that is associated with the storage device. Thus, if a host adapter 24(n) does holds the device lock, it can access the other information in the cache index table 32(d) to, in turn, determine from the respective descriptors 36(c)(t) indicate whether a particular track of the storage device 22 associated with the cache index table 32(d) is cached in a cache slot 31(s) and, if so, where. On the other hand, if a host adapter does not hold the device lock, it will not be able to access the other information in the cache index table 32(d), and thus will normally not be able to determine whether a particular track of the storage device 22 associated with the cache index table 32(d) is cached in a cache slot 31(s) and, if so, where, at least until the host adapter 24(n) is able to get the device lock.

The device lock/slot lock arrangement described above works well for system 10 used in a number of processing environments and applications. A problem arises, however, if system 10 is to be used in, for example, a transaction processing environment, since a number of the host adapters 24(n) may need to access information in a particular storage device 22 contemporaneously to provide real- or near-real-time service. To accommodate that, generally, for host adapters 24(n) that are connected to host computers 11(n) that are performing transaction processing operations in connection with the information stored in one or more of the storage devices 22, accesses by those host adapters 24(n) are controlled by the slot locks for accesses for the tracks which are cached in a cache slot 32(s). Generally, if a host adapter 24(n), operating in a "transaction processing mode," wishes to access a cache slot 32(s) caching information associated with a track of a particular storage device 22, it will be able to do so if it (that is, the host adapter 24(n)) has the slot lock for the particular cache slot 32. In that situation, the host adapter 24(n) need not also have the device lock for the storage device 22. Accordingly, multiple host adapters 24(n), operating in the transaction processing mode, can contemporaneously access respective cache slots 32(s) which cache information associated with respective tracks of the same storage device 22, which can enhance the ability of the system 10 to provide real- or near-real-time service in connection with transaction processing.

Figure 3:
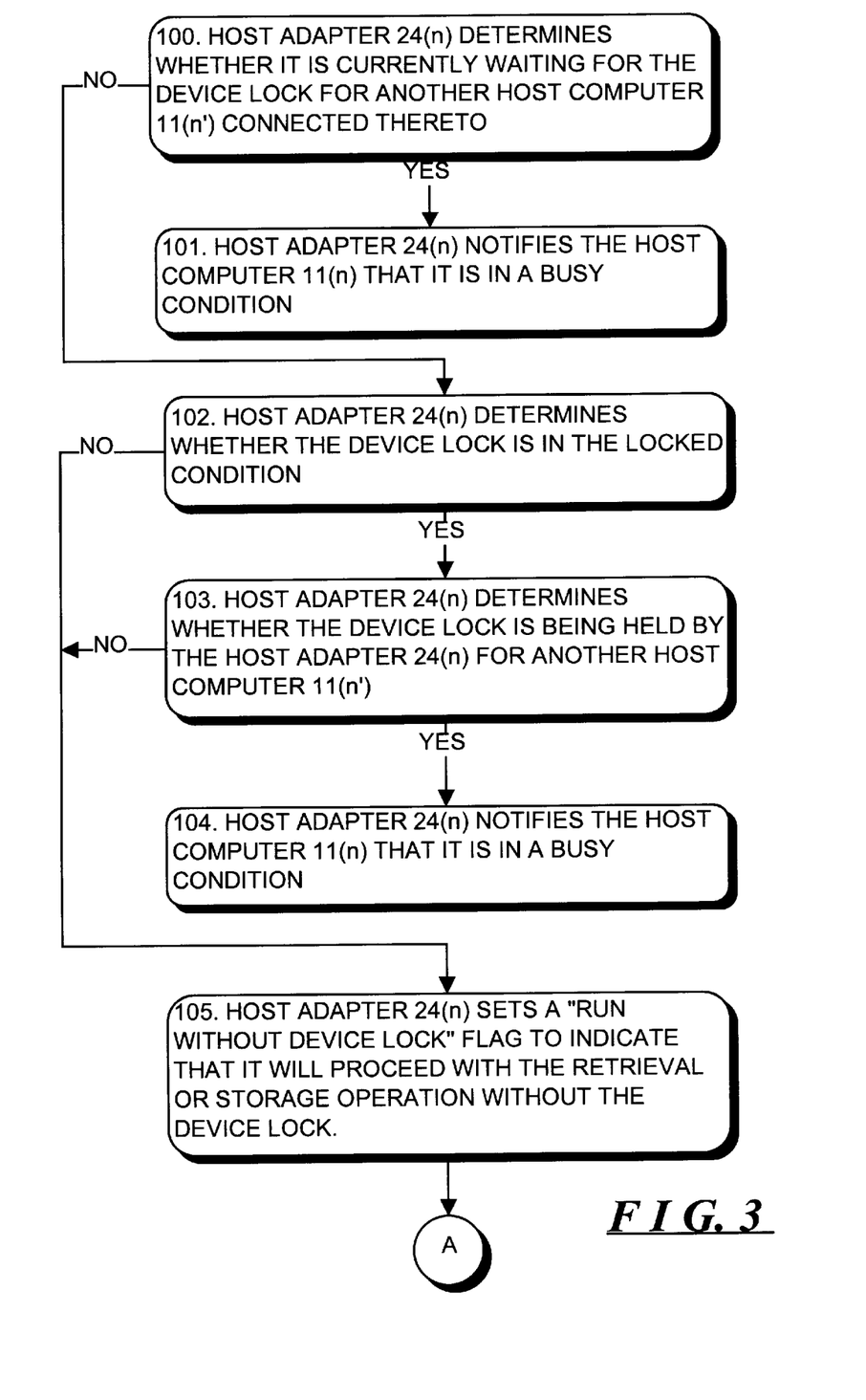
FIG. 3 is a flowchart depicting operations performed by the mass storage subsystems in connection with the invention.
Figure 3A:
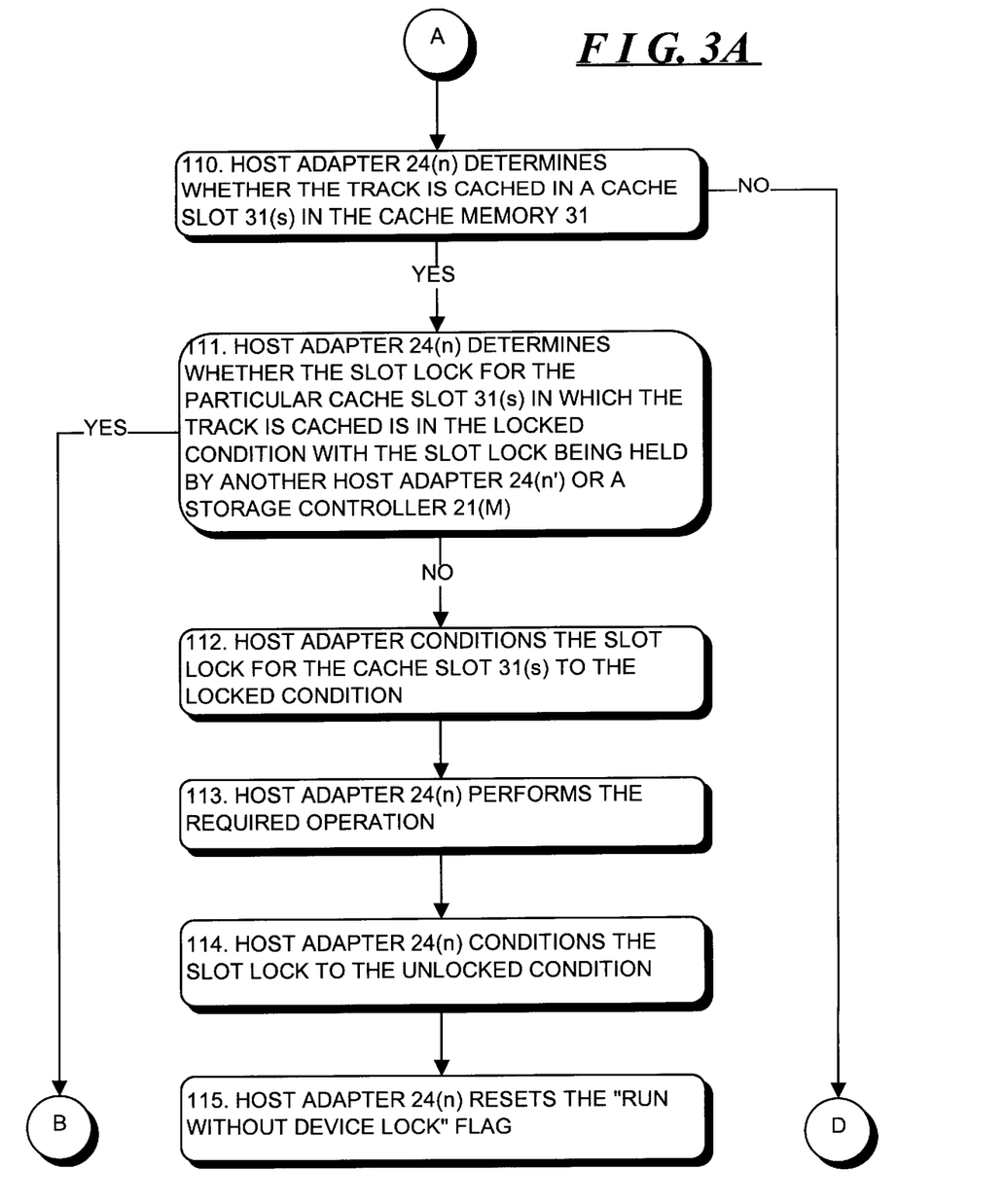
Figure 3B:
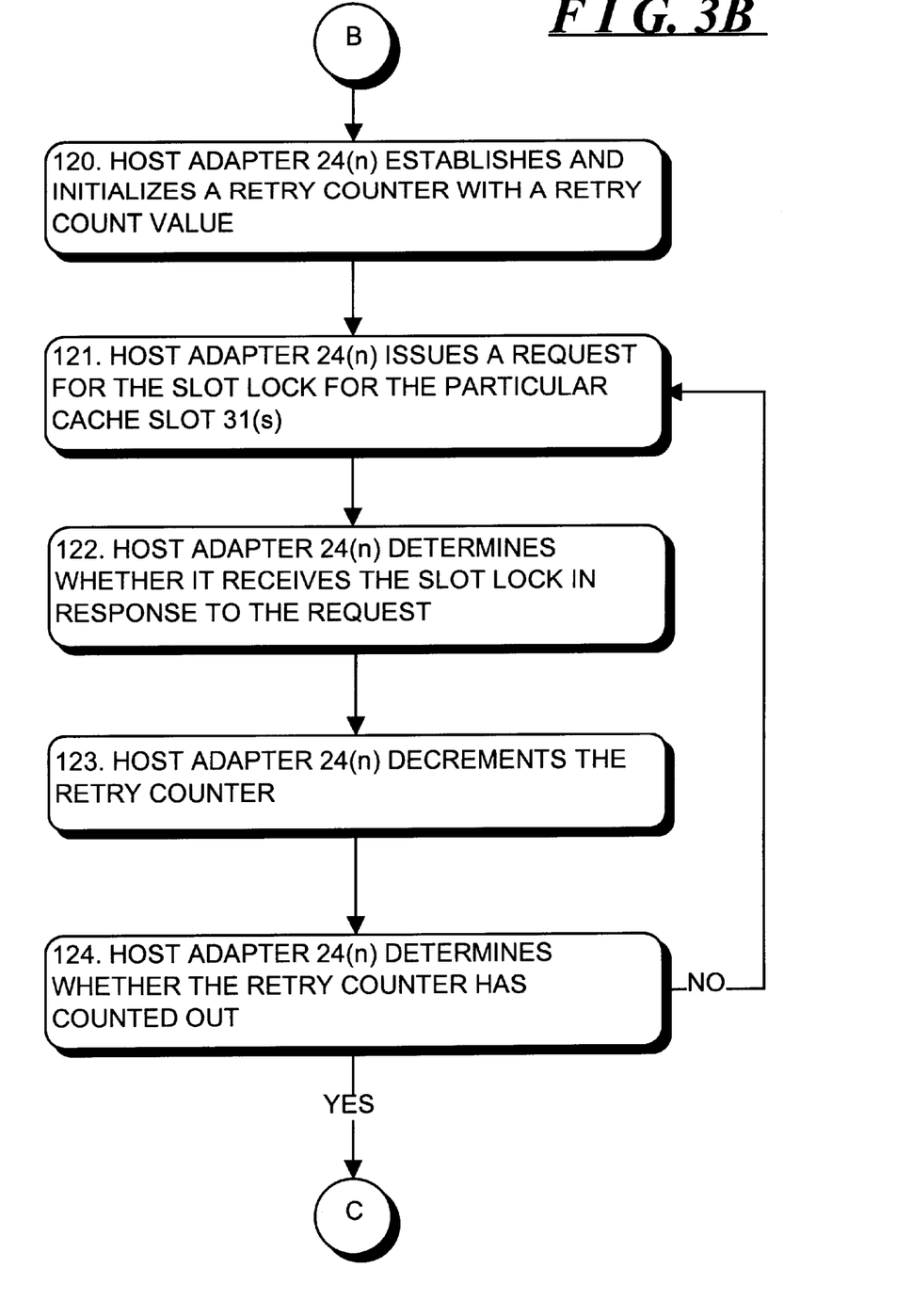
Figure 3C:
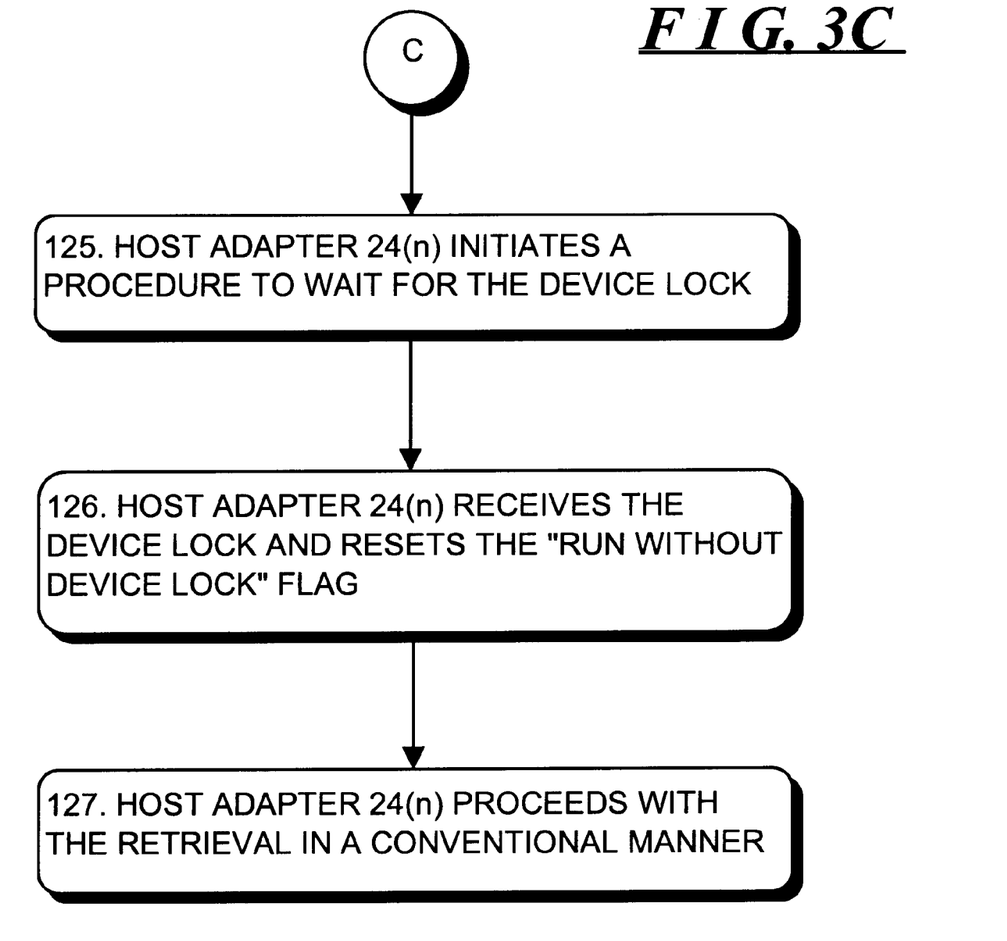
Figure 3D:
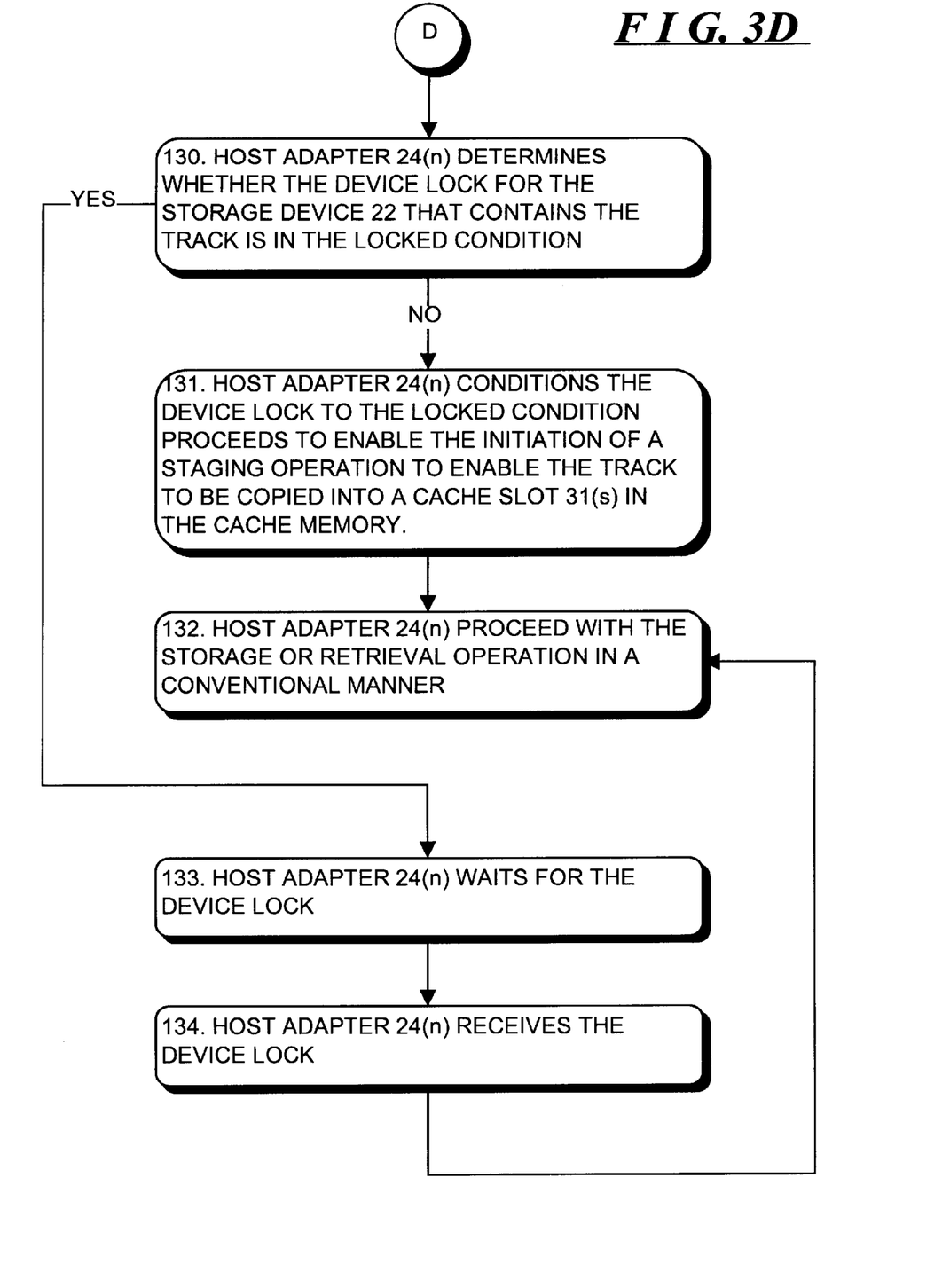

The operations performed by a host adapter 24(n) for a storage or retrieval operation for a host computer 11(n) in connection with the transaction processing mode will be described in connection with the flowchart depicted in FIG. 3. With reference to FIG. 3, the host adapter 24(n) first performs a series of steps to determine how to proceed based on the condition of the device lock and other conditions. Generally, the host adapter 24($n$) will proceed based on (i) whether the device lock is in the locked condition;
(ii) if the device lock is in the locked condition, which host adapter 24($n$) holds the device lock, and
(iii) if the host adapter 24($n$) holds the device lock, whether the host adapter 24($n$) is holding the device lock in connection with an access previously initiated by the another host computer 11($n'$) ($n' \neq n$).

(The last item (item (iii)) is provided for one embodiment based on the fact that, in that embodiment, when the host adapter 24($n$) request or holds a the device lock for one host computer 11($n$), data structures (not shown) are established in the host adapter 24($n$) which can be corrupted if it (that is, the host adapter 24($n$) were to request a device lock for another host computer 11($n'$)($n' \neq n$); it will be appreciated that, in the absence of such a data structure limitation, the condition in item (iii) need not be observed.) Thus, host adapter 24($n$) will initially determine whether it is currently waiting for the device lock for another host computer 11($n'$)($n' \neq n$) connected thereto (step 100). If the host adapter 24($n$) makes a positive determination in step 100, it will notify the host computer 11($n$) that it (that is, the host adapter 24($n$)) is in a busy condition (step 101). The host computer 11($n$) may thereafter retry the operation with the host adapter 24($n$) at a later time, or it may retry the operation immediately in connection with another host adapter 24($n'$)($n' \neq n$) to which it is connected.

If the host adapter 24($n$) makes a negative determination in step 100, that is, if it determines that it is not currently waiting for the device lock for another host computer 11($n'$)($n' \neq n$); it will determine whether the device lock is in the locked condition (step 102). If the host adapter 24($n$) makes a positive determination in step 102, it will determine whether the device lock is being held by the host adapter 24($n$) for another host computer 11($n'$)($n' \neq n$) (step 103), and, if so, it will notify the host computer 11($n$) that it (that is, the host adapter 24($n$)) is in a busy condition (step 104). The host computer 11($n$) may thereafter retry the operation with the host adapter 24($n$) at a later time, or it may retry the operation immediately in connection with another host adapter 24($n'$)($n' \neq n$) to which it is connected.

If the host adapter 24($n$) makes a negative determination in step 103, that is, if it determines that the device lock is in the locked condition, with the lock being held by a host computer through another host adapter, it will proceed to a step 105 to set a "run without device lock" flag (not separately shown) to indicate that it will proceed with the retrieval or storage operation without the device lock.

Following step 105, the operations performed by the host adapter 24($n$) will depend on whether the particular track of the storage device 22 from which information is to be retrieved, during a retrieval operation, or in which information is to be stored, during a storage operation, is cached in a cache slot 31($s$) in the cache memory 31. It will be appreciated that the host adapter 24($n$) can determine whether the track is in the cache memory 31 by determining the condition of the cached flag 40($c$)($t$) associated with the particular track in the cache index table 32($d$) for the to appropriate storage device 22. Thus, while the "run without device lock" flag is set, if the host adapter 24($n$) determines that the track is cached in a cache slot 31($s$) in the cache memory 31 (step 110), it (that is, the host adapter 24($n$)) will proceed to determine whether the slot lock for the particular cache slot 31($s$) in which the track is cached is in the locked condition with the slot lock being held by another host adapter 24($n'$)($n' \neq n$) or a storage controller 21($m$) (step 111). If the host adapter makes a negative determination in step 111, that is, if it determines that the track is not in the locked condition with the slot lock being held by another, it will condition the slot lock for the cache slot 31($s$) to the locked condition (step 112) and perform the required operation (step 113), that is, if the operation is a retrieval operation, it will retrieve the required information from the cache slot 31($s$) for provision to the host computer 11($n$) that issued the retrieval request, or, if the operation is a storage operation, it will store the information from the host computer 11($n$) in the cache slot 31($s$). It will be appreciated that the host adapter 24($n$) can identify the particular cache slot 31($s$) in which the track is cached by reference to the cached slot pointer flag 41($c$)($t$) associated with the particular track in the cache index table 32($d$) for the appropriate storage device 22. Thereafter, the host adapter 24($n$) may condition the slot lock to the unlocked condition (step 114) and reset the "run without device lock" flag (step 115).

On the other hand, if the host adapter 24($n$) determines in step 111 that the slot lock is being held by another host adapter 24($n'$)($n' \neq n$) or a storage controller 24($m$) it will proceed to try to obtain the slot lock. In that operation, the host adapter 24($n$) will first establish an initialize a retry counter (not separately shown) (step 120) and thereafter issue a request for the slot lock for the particular cache slot 31($s$) (step 121). Thereafter, the host adapter 24($n$) will determine whether it receives the slot lock in response to the request (step 122). If the host adapter 24($n$) makes a positive determination in step 122, it will proceed to step 113 to condition the slot lock to the locked condition and retrieve the required information. On the other hand, if the host adapter 24($n$) makes a negative determination in step 122, it will decrement the retry counter (step 123), and determine whether the retry counter has counted out (step 124). If the host adapter 24($n$) determines in step 124 that the retry counter has not been decremented to zero, it will return to step 121 to issue another request for the slot lock.

The host adapter 24($n$) will perform steps 121 through 124 through one or more iterations until it either determines in step 122 that it receives the slot lock, or in step 124 that the retry counter has been decremented to zero. If the host adapter 24($n$) determines in step 124 that the retry counter has been decremented to zero, it will sequence to a step 125 to initiate a procedure to wait for the device lock. After receiving the device lock, the host adapter 24($n$) will reset the "run without device lock" flag (step 126) and proceed with the retrieval in a conventional manner (step 127). Requiring the host adapter 24($n$) to wait for the device lock in step 125 if it is unable to obtain the slot lock in steps 121 through 124 through a predetermined number of retries will allow for, for example, error recovery in the event of a possible failure or other malfunction of the particular host adapter 24($n'$) ($n' \neq n$) or storage controller 21($m$) which currently has the slot lock.

Returning to step 110, if the host adapter 24($n$) determines in that step that the track from which information is to be retrieved or in which information is to be stored is not cached in the cache memory 31, it will proceed to a step 130 to determine whether the device lock for the storage device 22 that contains the track is in the locked condition. If the host adapter 24($n$) makes a negative determination in step 130, it will condition the device lock to the locked condition (step 131) and proceed to enable the initiation of a staging operation to enable the track to be copied into a cache slot 31 ($s$) in the cache memory. Thereafter, the host adapter 24($n$) can proceed with the storage or retrieval operation in a conventional manner (step 132). On the other hand, if the host adapter 24(*n*) makes a positive determination in step 130, it will wait for the device lock (step 133), and, after receiving the device lock (step 134) sequence to step 132 to proceed with the storage or retrieval operation in a conventional manner.

The invention provides a number of benefits. In particular, the invention provides for enhanced operation in, particularly, a transaction processing environment, in which information in records stored on the mass storage subsystem 11 are accessed and updated generally irregularly, so as to enhance the real- or near-real-time processing of transactions in connection with such information. Since the host adapter 24(*n*) generally does not need to wait for the device lock associated with a particular storage device 22 before performing a retrieval or storage operation in connection with tracks from the storage device 22 that are cached in respective cache slots 31(*s*) in the cache memory 31, the invention facilitates allowing multiple host adapters 24(*n*) to contemporaneously access diverse ones of the cache slots 31(*s*) which are caching information from respective storage devices. Thus, multiple ones of the host adapters 24(*n*) can retrieve information from or store information in the cache slots which are related to diverse tracks of the same storage device 22, without needing to obtain the device lock for the storage device 22.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A mass storage subsystem for use in a digital data processing system, the digital data processing system also including at least one host computer for generating access requests, the mass storage subsystem comprising:

A. a data storage subsystem including at least one data storage device, the data storage device including at least one logical data store for storing at least one data item;

B. a cache memory including a plurality of cache slots for caching data items from respective logical data stores provided thereto by said data storage subsystem C. a plurality of cache locks each for use in regulating access to an associated one of said cache slots;

D. a device lock for regulating access to all of the cache slots caching data items from respective logical data stores of said at least one data storage device; and E. a host adapter for receiving access requests from said host computer, the host adapter being responsive to each respective access request to initially determine whether it holds the device lock associated with the data storage device containing the data item to be accessed in response to the respective access request, the host adapter, in response to a negative determination, determining whether the logical data store containing the data item to be accessed is cached in said at least one cache slot and, if so, using the slot lock associated therewith to control access thereby to the data item to be accessed regardless of the condition of the device lock.

2. A mass storage subsystem as defined in claim 1 in which, if said host adapter determines that the logical data store containing the data item to be accessed is not cached in said at least one cache slot, said host adapter uses the device lock associated with the storage device to control access thereby to the data storage device.

3. A mass storage subsystem as defined in claim 2 in which, when the host adapter obtains the device lock, the host adapter enables the data storage subsystem to initiate a staging operation to cache the logical data store containing the data item to be accessed in said at least one cache slot.

4. A mass storage subsystem as defined in claim 3 in which, after said staging operation, the host adapter accesses the data item to be accessed in said at least one cache slot.

5. A mass storage subsystem as defined in claim 1 in which said if the host adapter is delayed in obtaining the slot lock more than a predetermined amount of time, the host adapter uses the device lock associated with the storage device to control access thereby to the cache slot that caches the logical data store containing the data item to be accessed.

6. A mass storage subsystem as defined in claim 1, in which said host adapter receives access requests from a plurality of host computers, the host adapter in response to receipt of an access request from one of said host computers, returning a busy indication if host adapter is holding the device lock for another of said host computers.

7. A mass storage subsystem as defined in claim 1, in which said host adapter receives access requests from a plurality of host computers, the host adapter in response to receipt of an access request from one of said host computers, returning a busy indication if host adapter is waiting for the device lock for another of said host computers.

8. A method of operating a host adapter for use in a mass storage subsystem, the mass storage subsystem further comprising:

i. a data storage subsystem including at least one data storage device, the data storage device including at least one logical data store for storing at least one data item;

ii. a cache memory including a plurality of cache slots for caching data items from respective logical data stores provided thereto by said data storage subsystem iii. a plurality of cache locks each for use in regulating access to an associated one of said cache slots; and iv. a device lock for regulating access to all of the cache slots caching data items from respective logical data stores of said at least one data storage device;

the method comprising the steps of:

A. receiving an access request from a host computer,

B. initially determining whether the host adapter holds the device lock associated with the data storage device containing the data item to be accessed in response to the respective access request, the host adapter, C. in response to a negative determination in said device lock determination step, performing a cache hit determination step to determine whether the logical data store containing the data item to be accessed is cached in said at least one cache slot D. in response to a positive determination in said cache hit determination step, using the slot lock associated with the cache slot associated with the cache slot containing the data item to be accessed to control access to the data item to be accessed regardless of the condition of the device lock.

9. A method as defined in claim 8 further comprising the step of, if said host adapter makes a negative determination in the cache hit determination step, using the device lock associated with the storage device to control access thereby to the data storage device.

10. A method as defined in claim 9 further comprising the step of, after the host adapter obtains the device lock, enabling the data storage subsystem to initiate a staging operation to cache the logical data store containing the data item to be accessed in said at least one cache slot.

11. A method as defined in claim 10 further comprising the step of, after said staging operation, accessing the data item to be accessed in said at least one cache slot.

12. A method as defined in claim 8 further comprising the steps of

A. determining whether the host adapter is delayed in obtaining the slot lock more than a predetermined amount of time, and B. in response to a positive determination in said delay determination step, using the device lock to control access to the cache slot that caches the logical data store containing the data item to be accessed.

13. A method as defined in claim 8 in which:

A. the access request receiving step includes the step of receiving access requests from a plurality of host computers; and B. returning a busy indication to one of said host computers if the host adapter is holding the device lock for another of said host computers.

14. A method as defined in claim 8 in which

A. the access request receiving step includes the step of receiving access requests from a plurality of host computers; and B. returning a busy indication if host adapter is waiting for the device lock for another of said host computers.

* * * * *